3,534,114
COMBINATION OF Gd ALUMINO-SILICATE CATALYST AND HYDROGENATION CATALYST
Ronald D. Bushick, Glen Mills, Pa., assignor to Sun Oil Company, Philadelphia, Pa., a corporation of New Jersey
No Drawing. Filed Mar. 26, 1968, Ser. No. 718,980
Int. Cl. C07c 15/20
U.S. Cl. 260—668           12 Claims

ABSTRACT OF THE DISCLOSURE

A process for converting hydrocarbons comprises contacting a hydrocarbonaceous feed in a conversion zone at an elevated temperature with a novel composition comprising an acidic acid Gd alumino-silicate catalyst and from 0.5 to 25% by weight of a hydrogenation catalyst, and recovering a hydrocarbon conversion product having an average molecular weight no greater than that of the hydrocarbonaceous feed. The Gd alumino-silicate catalyst contains less than one alkali metal cation and at least one divalent or trivalent metal, metal oxide or metal hydroxide for every 12 atoms of aluminum in the alumino-silicate zeolite framework.

The hydrogenation catalyst can be platinum, palladium, nickel, nickel oxide, nickel sulfide, molybdenum oxide, molybdenum sulfide, cobalt oxide and palladium oxide. The hydrogenation catalyst can be physically admixed with the Gd catalyst, or incorporated therein by salt impregnation or ion exchange.

The novel catalyst combination is especially useful for the conversion of polycyclic aromatic hydrocarbons, such as converting s-octahydroanthracene to such compounds as tetralin, 1-cyclohexyl-2-phenylethane, asymmetrical octahydroanthracene, asymmetrical octahydrophenanthrene, 1,2,3,4-tetrahydroanthracene, 1,2,3,4-tetrahydrophenanthrene anthracene phenanthrene, and s-octahydrophenanthrene.

CROSS REFERENCES TO RELATED APPLICATIONS

Gd-containing zeolites which can be utilized as catalysts in the subject process have been described in copending application Ser. No. 590,225, filed Oct. 28, 1966 of Ronald D. Bushick entitled "Alumino-Silicate Catalyzed Reactions of Polycyclic Aromatic Hydrocarbons" now U.S. Patent 3,396,203, and in copending application Ser. No. 581,129, filed Aug. 25, 1966 of Francis William Kirsch, David S. Barmby and John D. Potts entitled "Process for Paraffin-Olefin Alkylation," and now abandoned and in copending application Ser. No. 716,190, filed of even date with the present application, of Francis William Kirsch, David S. Barmby and John D. Potts entitled "Process for Paraffin-Olefin Alkylation" and in copending application Ser. No. 715,998, filed of even date with the present application of Francis William Kirsch, David S. Barmby and John D. Potts, entitled "Gd Zeolite and Hydrocarbon Conversion Process with Gd Zeolite Catalyst," and in copending application Ser. No. 715,994, filed of even date with the present application, of Alfred E. Hirschler entitled "Hydrocarbon Conversion Process with Gd Catalyst," all of these being assigned to Sun Oil Company. The disclosure of all of the above-cited applications is hereby incorporated in the present application.

BACKGROUND OF THE INVENTION

Although it is known to utilize crystalline alumino-silicates zeolites containing cations of lanthanum, cerium or of certain rare earth salt mixtures as hydrocarbon conversion catalysts (e.g., see U.S. 3,140,249 and U.S. 3,210,267), the art has failed to realize that incorporation of substantial quantities of gadolinium cations in an amorphous or crystalline alumino-silicate zeolite can be used to produce an adsorbant for aromatic hydrocarbons or a catalyst which is especially useful for hydrocarbon conversion reactions, and particularly conversions involving carbonium-ion mechanisms. Similarly, the art has failed to appreciate that a combination of a Gd alumino-silicate catalyst with a hydrogenation catalyst can be especially useful for conversions involving catalytic contacting of hydrocarbons in the presence of hydrogen, such as aromatization of naphthenes or olefins, cyclizations, reforming, hydrocracking and hydroisomerization.

BRIEF SUMMARY OF THE INVENTION

Hydrocarbon conversion reactions, such as cracking, dehydrogenation, reforming, alkylation, dealkylation, cyclization and isomerization can be effected by contacting a hydrocarbon feed with a catalyst comprising an alumino-silicate zeolite containing cations of gadolinium, such as $Gd^{+3}$, $Gd(OH)^{+2}$, and $Gd(OH)_2^{+}$. Also effective as catalysts in such processes are novel catalysts comprising gadolinium-containing zeolites which also contain magnesium cations, aluminum cations, silver cations, nickel cations, zinc cations, cerium cations, lanthanum cations, cations of the hydroxides or oxides of these metals or mixtures of two or more of such cations.

The preferred zeolite catalyst is crystalline and capable of absorbing benzene, has an atomic ratio Al/Si of 0.65 to 0.35 and contains at least one $Gd(OH)_2^{+}$ cation for every 8 atoms of aluminum in the alumino-silicate framework. The zeolite can also be utilized as an adsorbant, as for separating aromatic hydrocarbons from less polar compounds. In conversions involving oxidative regeneration of this catalyst (or adsorbant), crystallinity can decrease, usually accompanied by a decrease in activity and/or selectivity. The resulting, more amorphous, zeolite can be effective as a catalyst, particularly at conversion temperatures which are greater than those required for the corresponding conversion with an equal weight of crystalline zeolite.

An especially useful hydrocarbon conversion reaction is the hydroisomerization of the $C_4$-$C_9$ paraffin hydrocarbons which are capable of conversion to more highly branched isomers, in order to obtain a more highly branched product with improved octane ratings. Another especially useful conversion is the alkylation of $C_6$-$C_{14}$ aromatic (or $C_7$-$C_{22}$ alkyl aromatic) hydrocarbons, or $C_2$-$C_9$ paraffin hydrocarbons, with olefin hydrocarbons. Another especially useful conversion is the isomerization of such polycyclic aromatic hydrocarbons as s-octahydrophenanthrene (s-OHP) to produce s-octahydroanthracene (s-OHA) and/or such aromatic hydrocarbons as 1-cyclohexyl-2-phenyl ethane, asymmetrical octahydrophenanthrene, 1,2,3,4-tetrahydroanthracene, 1,2,3,4-tetrahydrophenanthrene, anthracene, phenanthrene and tetralin.

FURTHER DESCRIPTION OF THE INVENTION

Pentene-isomerization activity is a measure of the acid activity of a catalyst, and, therefore, indicative of the ability of the catalyst to catalyze typical carbonium-ion reactions such as cracking, dealkylation, aromatic alkylation, polymerization, isomerization, etc. By utilizing the isomerization of pentene-1 as a test reaction, it has been found that a substantially anhydrous GdHY catalyst, prepared by activation of a crystalline $GdNH_4Y$ zeolite (obtained by Gd-cation exchange of highly ammonium-exchanged sodium Y zeolite), is more effective than a similarly prepared CeHY catalyst wherein, instead of aqueous gadolinium cations, aqueous cerium cations were present in the exchange medium.

In the Gd alumino-silicate catalyst, at least 25% and, preferably, at least 40% of the electronegativity associated with the alumino-silicate framework is satisfied by cations of gadolinium or of its oxides or hydroxides. When the Gd catalyst contains less than one alkali metal cation (e.g. Na+) for every 4 aluminum atoms in the alumino-silicate framework, the catalyst is especially useful for such hydrocarbon conversion reactions as isomerizing polycyclic aromatic hydrocarbons, paraffin-olefin alkylation and the cracking of gas oil. Preferably, the alumino-silicate zeolite is crystalline and is chemically characterized by the empirical formula

$$M_x(AlO_2)_x(SiO_2)_y \cdot (H_2O)_z$$

where $x$, $y$ and $z$ are integers, the ratio $x/y$ being from 1.0 to 0.2 and where M is chosen from at least one of the following groups:

(1) at least one Gd$^{+3}$ cation for every 12 atoms of aluminum in the alumino-silicate framework of said zeolite;
(2) at least one cation of Gd(OH)$^{+2}$ for every 8 atoms of aluminum in the alumino-silicate framework of said zeolite;
(3) at least one cation of Gd(OH)$_2^{+1}$ for every 4 atoms of aluminum in the alumino-silicate framework of said zeolite;
(4) a combination of the members of at least two of the above groups;

and wherein the balance of the cations necessary for electronic equivalency comprises H+ or cations of metals, metal oxides or metal hydroxides and wherein there is less than one alkali metal cation for every four atoms of aluminum in the alumino-silicate zeolite, more preferably, less than one alkali metal cation for every ten atoms of aluminum.

The Gd zeolite can contain as such additional cations, the cations of magnesium, aluminum, silver, nickel, zinc, cerium, lanthanum and mixtures of these cations. In such catalysts it is preferred that at least one such cation is present for every 20 atoms of aluminum in the alumino-silicate framework of said zeolite.

For most hydrocarbon conversions, the ratio $x/z$ in the empirical formula of the zeolite should be in the range of 0.25 to 2. If excess water is present, the zeolite should be "activated" by heating according to the procedure disclosed in the aforementioned applications of Kirsch, Barmby and Potts. If the zeolite is deficient in "bound" water, water can be added, as by exposure to steam in air or nitrogen.

As used herein, the term "framework," is reference to the alumino-silicate portion of the zeolite (which can be crystalline or amorphous), excludes those aluminum ions which are in exchange positions and which are neutralizing some of the negative charge associated with the aluminum atoms in the alumino-silicate tetrahedra of the zeolite. Note that aluminum in the alumino-silicate framework can be either trigonal or tetrahedral.

For such reactions as reforming, aromatization, hydrogen transfer, hydrocracking and hydroisomerization, it is preferred that the catalyst have incorporated therewith from 0.05 to 25% (more preferably, 0.05 to 5%) of a hydrogenation catalyst component containing a hydrogen-active metal such as platinum, palladium, rhodium, rhenium, ruthenium, molybdenum, cobalt or nickel (or a chemical compound, as an oxide or sulfide, of such a metal). The hydrogen-active metal can also be incorporated on a carrier (as alpha-alumina, microporus silica, conventional amorphous silicaalumina cracking catlyst, or acid-exchanged clays, such as montmorillonites or kaolin). When the hydrogen-active metal component (or a chemical compound of the metal) is so incorporated on a carrier, it is preferred that the Gd catalyst be physically admixed therewith.

When the hydrocarbon conversion involves cyclization and/or aromatization, as with a feed of n-pentene, n-hexene, n-heptene or 1,4-dimethylnaphthalene, the cyclization conditions comprise a temperature in the range of 350–850° F. and a pressure in the range of 0–750 p.s.i.g., preferably with the reactants maintained in the vapor or trickle phase. For armatization and/or cyclization of a cracked naphtha, temperature in the range of 240–600° F. is preferred at atmospheric pressure. For a hydrogen transfer reaction, to produce aromatics from naphthenes, a temperature in the range of 300–500° F. at atmospheric pressure is preferred, as when cyclohexane and propylene are the feed hydrocarbons and the products are benzene plus propane.

For double-bond isomerization, such as for the conversion of 2-ethyl-1-butene to cis and trans 3-methyl-2-pentene, or the conversion of pentene-1 to pentene-2, a temperature in the range of 70–400° F. and pressures from 0–75 p.s.i.g. are preferred, with the lower temperatures and higher pressures most preferred in order to reduce cracking.

For isomerization and/or transalkylation of alkyl benzenes, such as converting meta-xylene to ortho and para xylene, the hydrocarbon reactant can be either in liquid or vapor phase at a temperature in the range above about 60° C. and below cracking temperature. The preferred temperature range for xylene isomerization is 150–350° C. and preferably in the presence of added hydrogen (n.e. 5–75 p.s.i.).

When the primary conversion reaction is cracking, a temperature in the range of 800–1100° F. is preferred for a gas oil feed, preferably at atmospheric or slightly elevated pressure, although pressures as low as 1 mm. Hg and as high as 1200 p.s.i.g. can be utilized in such cracking reactions. When the predominant reaction is hydrocracking, our preferred hydrogen-active metal is selected from Group VI$b$, VIII, and more preferably comprises Ni, Pd or Pt. The preferred hydrogen pressure is in the range of 500–5000 p.s.i. at conversion temperatures from 650–1100° F.

For paraffin-olefin alkylation, the preferred process conditions with a C$_3$–C$_9$ feed olefin are those of the aforementioned patent applications of Kirsch, Barmby and Potts. Generally, these involve (a) contacting C$_3$–C$_9$ monoolefin with C$_4$–C$_6$ isoparaffin and with a substantially anhydrous Gd zeolite catalyst at a temperature below the critical temperature of the lowest boiling hydrocarbon reactant and at a pressure such that each of the reactants is in liquid phase, and, (b) stopping such contacting after substantial alkylation has occurred but before the weight rate of production of unsaturated hydrocarbon becomes greater than the weight rate of production of saturated hydrocarbon.

Preferably, the feed olefin and feed paraffin are admixed prior to contact with the catalyst and the concentration of unreacted olefin is kept sufficiently low that predominantly saturated paraffin-olefin alkylation products are obtained rather than unsaturated products. This concentration is preferably less than seven, more preferably less than 12 mole percent, based on the total paraffin content of the reaction mixture. Also preferred is the use of a halide adjuvant (as HCl, CCl$_4$ and the C$_1$–C$_6$ monochloro paraffins) containing bromine, chlorine or fluorine, to increase the yield of liquid paraffin based on the olefin charged. Also preferred is a temperature in the range of 25–120° C. and a mean residence time of the reaction mixture with the catalyst in the range of 0.05 to 0.5 hour per (gram of catalyst per gram of hydrocarbon in the reaction mixture). When the feed olefin comprises ethylene, conditions shown in U.S. 3,251,902 can be used to produce a liquid product; however, this liquid product is generally less preferred as a component of gasoline than are the highly branched liquid paraffin hydrocarbons which are produced by the aforementioned process of the Kirsch, Barmby and Potts applications.

For the isomerization of such polycyclic aromatic hydrocarbons as s-OHA to its isomer s-OHP, or s-OHP to its isomer s-OHA, the preferred conditions include a temperature above 80° C. and below cracking temperature and are shown in the aforementioned application of Ronald D. Bushick, Ser. No. 590,225. This Bushick application also shows the preparation of a novel composition comprising an acidic Gd alumino-silicate catalyst and from 0.5 to 5% of a hydrogenation catalyst. Preferably the hydrogenation catalyst is selected from the group consisting of platinum, palladium, nickel, nickel oxide, nickel sulfide, molybdenum oxide, molybdenum sulfide, cobalt oxide, palladium oxide and mixtures thereof. The hydrogenation catalyst can be physically admixed with the acidic alumino-silicate, or have been incorporated into the alumino-silicate by salt impregnation or by ion exchange. When the salt has been introduced into the alumino-silicate catalyst by ion exchange, it is preferred that the hydrogenation catalyst be reduced, as with hydrogen, prior to contact of the catalyst with the hydrocarbon feed. Also preferred is a process for the isomerization of polycyclic aromatic hydrocarbons, such as s-OHA or s-OHP, wherein the Gd catalyst/hydrogenation catalyst combination and from 25–1000 p.s.i.g. of hydrogen are present in the reactor. The added hydrogen aids in maintaining the activity of the isomerization catalyst combination, and can be recycled at rates up to 10,000 s.c.f./bbl. of feed. The LHSV is preferably in the range of 0.25–5.0 volumes of feed per volume of catalyst per hour.

In any of the above-listed reactions, if the catalyst activity appreciably decreases during the course of the reaction, the catalyst may be separated from the hydrocarbon reactants and regenerated, as by burning in air. After such burning, water can be added to the catalyst, as by exposure to steam in air or nitrogen. When a hydrogen-active metal is incorporated into the zeolite catalyst, it is sometimes advantageous to reduce the regenerated combination with hydrogen, preferably at 250° to 800° F., prior to introduction of the hydrocarbonaceous feed.

When the primary hydrocarbon conversion is a hydroisomerization or a reforming reaction, the preferred conditions include a hydrogen pressure of at least 25 p.s.i.g. and temperatures from 500 to 700° F., although the conversion can be effected in the range of 225–1000° F., at total pressures in the range of 0–5000 p.s.i.g. and hydrogen pressures in the range of 0.5–4000 p.s.i.g. For the hydroisomerization of $C_5$–$C_9$ paraffins, the preferred catalyst combination will contain from 0.1 to 2 percent of Pt, Pd or Re (or a mixture thereof) or from 1 to 10% of Ni.

Typical feeds and reaction conditions which are effective when utilizing the Gd catalyst, particularly when combined with a hydrogenation catalyst, for hydroisomerization or reforming are those in the following United States patents: 2,834,439; 2,970,968; 2,971,904; 2,983,670; 3,114,695; 3,122,494; 3,132,089; 3,140,253; 3,146,279; 3,190,939; 3,197,398; 3,201,356; and 3,236,762.

In processes utilizing the Gd catalyst, whether alone or in combination with a hydrogenation catalyst, halide adjuvants containing chlorine, fluorine or bromine can frequently be used to increase the degree of conversion. Preferred adjuvants include $CCl_4$, HCl, $AlBr_3$ $BF_3$, HF and the $C_1$–$C_6$ chlorohydrocarbons.

ILLUSTRATIVE EXAMPLES

In the following examples, Example I shows the preparation of a preferred embodiment of the Gd catalyst and Example II shows the incorporation therewith of a Pt-hydrogenation catalyst. Example III shows contacting n-pentane with this combination of a Gd catalyst and a Pt catalyst and obtaining, as the major product, isopentane. Example IV shows a similar hydrocarbon conversion of n-pentane, wherein Example III is repeated except that a CeHY zeolite is substituted for GdHY zeolite in the catalyst combination. Example V shows a test reaction with a pentene-1 feed which indicates that the Gd zeolite catalyst of Example I has appreciably greater activity than a similar Ce zeolite catalyst for carbonium-ion reactions such as cracking (including gas oil cracking), Example VI shows the hydroisomerization of a straight run gasoline stream, by contacting with the Gd catalyst/hydrogenation catalyst combination of Example II, to upgrade the octane rating of the gasoline. Example VII shows paraffin-olefin alkylation with the Gd zeolite catalyst of Example I.

EXAMPLE I

About 500 g. of NaY zeolite was exchanged, filtered and washed for 16 cycles with aqueous $NH_4Cl$ utilizing the procedures disclosed in the aforementioned United States application, Ser. No. 581,129. The resulting $NH_4Y$ zeolite was similarly exchanged for 16 cycles with aqueous gadolinium nitrate. The resulting Gd-exchanged $NH_4$-exchanged zeolite was washed free of nitrate and unexchanged gadolinium ions, with distilled water, and dried in an oven at about 120° to produce a $GdNH_4Y$ zeolite. The zeolite was activated by heating slowly to 400° C. to remove water and decompose the bulk of any remaining ammonium ions. This activation utilized the procedures disclosed in the aforementioned United States Ser. No. 581,129. The zeolite before activation had the analysis listed in the attached Table I under the heading Run No. 628 (Run No. 674 is also this zeolite). The resulting substantially anhydrous GdHY zeolite was crystalline and capable of adsorbing benzene. The weight loss upon ignition analysis at 1800° C., of the activated zeolite was 3.41%.

EXAMPLE II

A solution of $Pt(NH_3)_2Cl_2$ in water was added dropwise with stirring to a dilute aqueous suspension of the catalyst in water, at 55° C. The amount of $Pt(NH_3)_2Cl_2$ used was equivalent to 0.5% Pt in the activated catalyst. After the Pt salt addition was complete (about 1 hr.), the solution was stirred at 55° C. for 30 minutes, filtered, and the catalyst washed with distilled water until the washings were free of chloride ion. The catalyst was dried, heated to 400° C. in a stream of dry air and then reduced at 400° C. in the reactor in a flowing stream of $H_2$ for one hour.

EXAMPLE III

N-pentane was passed through a bed of the activated catalyst combination of Example I, at a liquid hourly space velocity of 4.0 at 325° C./662° F. and 400 p.s.i.g., along with one mole of hydrogen for each mole of hydrocarbon feed. The product of this contacting contained 55.6 mole percent of isopentane. No more than two mole percent of the product was of lower molecular weight than the feed (thus, indicating a low degree of cracking) and less than 0.5 mole percent of the feed were products having a molecular weight higher than n-pentane.

EXAMPLE IV

Example II was repeated except that the catalyst combination was similarly activated combination of an activated cerium-exchanged, ammonium-exchanged Y zeolite and 0.5% of Pt. The reaction product contained only 51.7% of isopentane. That is, the Gd zeolite catalyst combination produced nearly 8% more isopentane than did the Ce zeolite catalyst combination.

EXAMPLE V

A 4.2 ml. portion of a solution of 21% pentene-1 in pentane was shaken with 0.50 g. of each above catalyst. Portions of the liquid were removed periodically for analysis. After 7 minutes contact time the conversion to pentene-2 was 12.7% over the CeHY and 72.8% over the GdHY. The monomeric olefin concentrations in the liquid phase were 17.3% and 12.5% respectively, showing that the GdHY was more active for polymerization of the olefin as well as for the isomerization to pentene-2.

EXAMPLE 2

A straight run gasoline feed was contacted at 325° C., 400 p.s.i.g. total pressure, in a tubular reactor, in the presence of added 100% hydrogen, with a bed of the reduced catalyst combination of Example II. Table I, under the heading "GdHY+0.5% Pt" reports the analysis and calculated octane ratings of the product obtained from three such runs, at various space rates and hydrogen/hydrocarbon ratios. These data indicate that preferred conditions for such gasoline upgrading (of streams containing at least 25% $C_5$–$C_6$ normal paraffin) with a Gd zeolite-hydrogenation catalyst combination (at 300–340° C.) include an LHSV of 1 to 4 (more preferably 1.5 to 2.5) at a hydrogen to hydrocarbon molar ratio in the range of 1 to 6.

TABLE 1.—ISOMERIZATION OF $C_5$–$C_6$ GASOLINE FOR OCTANE UPGRADING
[All runs at 325° C. and 400 p.s.i.g.]

| Hydrocarbon, wt. percent | Feed | Product GdHY+0.5% Pt | | |
|---|---|---|---|---|
| | | $A_1$ | $B_2$ | $C_2$ |
| $C_3$ | | 0.6 | 0.6 | 0.8 |
| i-$C_4$ | 0.3 | 2.4 | 1.9 | 2.3 |
| n-$C_4$ | 4.6 | 4.2 | 4.2 | 4.6 |
| i-$C_5$ | 18.7 | 35.2 | 33.2 | 31.9 |
| n-$C_5$ | 35.8 | 22.4 | 21.5 | 21.7 |
| 2,2-DMB | 1.1 | 4.4 | 5.5 | 5.5 |
| Cyclo $C_5$ | 3.5 | 3.0 | 3.0 | 3.0 |
| 2,3-DMB | 2.2 | 2.7 | 3.0 | 3.0 |
| 2-MP | 13.6 | 10.4 | 11.3 | 11.4 |
| 3-MP | 6.1 | 7.2 | 7.7 | 7.8 |
| n-$C_6$ | 9.4 | 6.5 | 7.0 | 7.0 |
| MCP | 1.7 | 0.9 | 1.0 | 0.9 |
| Cyclohexane | 0.2 | 0.1 | 0.1 | 0.1 |
| Benzene | 0.7 | | | |
| Heptanes | 0.5 | Trace | Trace | Trace |
| Octanes | 1.2 | | | |
| Percent Iso $C_5$ in $C_5$ | 34.4 | 61 | 60.6 | 59.5 |
| Percent Iso $C_6$ in $C_6$ | 71 | 79.2 | 79.7 | 79.8 |
| Percent 2,2-DMB in $C_6$ | 3.4 | 14.1 | 15.9 | 15.9 |
| Calculated: | | | | |
| F-1 clear | 70.6 | 79.1 | 78.8 | 77.5 |
| F-1+3 cc | 88.6 | 94.9 | 94.7 | 93.0 |

[1] Run A at 1.6 LHSV and 2.1 $H_2$/HC.
[2] Run B at 0.8 LHSV and 3.7 $H_2$/HC.
[3] Run C at 0.8 LHSV and 3.1 $H_2$/HC.
$H_2$/HC=molar ratio hydrogen/hydrocarbon.
LHSV=liquid hourly space velocity in volume of feed per volume of catalyst per hour.
All catalysts conditioned 48 hours at 325° C./400 p.s.i.g., 3 LHSV with n-pentane prior to contact with the straight run gasoline.

EXAMPLE VII

This example illustrates the use of substantially anhydrous acidic crystalline Gd alumino-silicate zeolite as paraffin-olefin alkylation catalyst. The catalyst of Example I (prepared by activating a 16-cycle $Gd^{+3}$/16-cycle $NH_4^+$-exchanged Type Y zeolite) was charged in amount of 23.3 g. into a one-liter, stirred autoclave containing a four-member baffle to diminish vortex formation. Then 444 milliliters of liquid isobutane and 1.0 g. of tertiary butyl chloride was added. The stirring rate (of a six-member, flat-blade turbine) was adjusted such that substantially all of the zeolite was suspended in the liquid isobutane (about 550 r.p.m.). The temperature in the reactor was raised to 80° C. using sufficient nitrogen to produce a total pressure of 250 p.s.i.g. Under these conditions, nearly all of the hydrocarbon is in the liquid phase. Then a liquid mixture of one part by volume of butene-2 and five volumes of isobutane was charged from a Jerguson gauge via a needle valve and dip tube into the isobutane-catalyst slurry (and near the bottom of the reactor) at the rate of one milliliter of mixture per minute for a period of 220 minutes. Nearly all of the hydrocarbon was maintained in liquid phase. At the end of this time the reaction was stopped by cooling the reactor to 17° C., then separating the reaction mixture from the catalyst by first removing the normally gaseous hydrocarbons at room temperature and atmospheric pressure, and then separating the liquid product from the catalyst by filtration. Some propane and n-butane but no methane, ethane, ethylene or propylene were found in the normally gaseous hydrocarbons. Table 2 reports the composition of the $C_5^+$ liquid product of this reaction (Run 628) and of a similar reaction run with a catalyst prepared from the same zeolite but by activation in helium rather than in air (Run 674). Also shown are similar runs made with catalysts prepared by air activation of a highly ammonium-exchanged Type Y zeolite (Run 576), a zeolite prepared as in Example I but exchanged with aqueous cerium nitrate instead of the aqueous gadolinium nitrate (Run 642) and a zeolite prepared by such cerium exchange of a highly ammonium-exchanged Type X zeolite (Run 622).

TABLE 2.—LIQUID PHASE ISOPARAFFIN-OLEFIN ALKYLATION WITH SOLID ZEOLITE CATALYSTS (GADOLINIUM VERSUS AMMONIUM VERSUS CERIUM AND TYPE X VERSUS TYPE Y ZEOLITE)
[Autogenous pressure, 80° C., i-$C_4$-ane/$C_4$-ene-2=15 (min.), 3.67 hrs., 1.0 g. tertiary butyl chloride adjuvant]

| Catalyst: | | | | | |
|---|---|---|---|---|---|
| Zeolite before activation | $GdNH_4Y$ | $GdNH_4Y$ | $NH_4Y$ | $CeNH_4X$ [1] | $CeNH_4Y$ |
| Activation (400° C.) gas | Air | He | Air | Air | Air |
| Run No | 628 | 674 | 596 | 622 | 642 |
| $C_5^+$ Paraffin yield, wt. percent OC | 163.0 | 169.8 | 43.5 | 130.0 | 161.6 |
| $C_5^+$ Unsaturates, wt. percent OC | 0.00 | 0.05 | 0.2 | 0.0 | 0.00 |
| $C_5^+$ Paraffin distribution, mole percent: | | | | | |
| $C_9^+$ | 3.7 | 5.8 | 18.9 | 8.3 | 5.4 |
| $C_8$ | 67.6 | 71.4 | 54.3 | 59.0 | 71.2 |
| $C_7$ | 5.7 | 7.7 | 6.2 | 4.8 | 7.4 |
| $C_6$ | 4.4 | 5.7 | 7.0 | 4.0 | 5.9 |
| $C_5$ | 18.5 | 9.3 | 13.6 | 23.9 | 10.0 |
| $C_8$ paraffin distribution: | | | | | |
| TMP | 88.1 | 88.2 | 59.3 | 85.7 | 85.9 |
| $DMH_x$ | 11.9 | 11.8 | 38.7 | 14.2 | 14.1 |
| $MH_p$ | 0.0 | 0.0 | 2.0 | 0.1 | 0.0 |
| TMP distribution: | | | | | |
| 2,2,4- | 27.4 | 28.4 | 13.6 | 15.5 | 24.4 |
| 2,2,3- | 5.9 | 5.4 | 5.1 | 4.1 | 5.6 |
| 2,3,4- | 28.8 | 29.1 | 39.6 | 34.0 | 32.0 |
| 2,3,3- | 37.9 | 37.1 | 41.7 | 46.4 | 38.0 |
| Catalyst analysis (ignited basis, before activation): | | | | | |
| Wt. percent Na | 9.97 | 0.97 | 1.05 | 0.93 | 0.97 |
| Wt. percent Ce or Gd | 14.39 Gd | 14.39 Gd | | 15.5 Ce | 13.99 Ce |
| Wt. percent N | 1.09 | 1.09 | 5.86 | 1.85 | 0.84 |
| Wt. percent loss on ignition | 25.35 | 25.35 | 29.67 | 25.47 | 26.28 |
| Analysis of Base Na zeolite (before exchange, ignited basis): | | | | | |
| Wt. percent Na | 9.51 | 9.51 | | | 9.42 |
| Wt. percent $Al_2O_3$ | 16.56 | 16.56 | | | 16.32 |
| Wt. percent $SiO_2$ | 45.29 | 45.29 | | | 47.87 |
| Wt. percent loss of ignition | 24.32 | 24.32 | | | 25.05 |

[1] Base $CeNH_4X$ zeolite analyzed 37.56% $SiO_2$ (17.56% Si).

I claim:
1. A composition comprising an acidic Gd alumino-silicate zeolite catalyst and from 0.05 to 5 percent of a hydrogenation catalyst, said Gd alumino-silicate containing less than one alkali metal cation and at least one divalent or trivalent metal, metal oxide or metal hydroxide for every 12 atoms of aluminum in said alumino-silicate zeolite framework, said framework having an Al/Si atomic ratio from 0.65–0.2, and wherein at elast 25% of the electronegativity associated with the alumino-silicate framework is satisfied by cations of gadolinium or of its oxides or hydroxides.

2. A composition according to claim 1 wherein said hydrogenation catalyst is selected from the group consisting of platinum, palladium, nickel, nickel oxide, nickel sulfide, molybdenum oxide, molybdenum sulfide, cobalt oxide, palladium oxide and mixtures thereof.

3. A composition according to claim 2 wherein said hydrogenation catalyst is physically admixed with the acidic alumino-silicate.

4. A composition according to claim 2 wherein said hydrogenation catalyst has been incorporated into the alumino-silicate by salt impregnation.

5. A composition according to claim 2 wherein said acidic Gd alumino-silicate catalyst is crystalline, and is capable of adsorbing benzene and wherein said hydrogenation catalyst has been introduced into the zeolite by ion exchange and wherein said Gd zeolite has an atomic ratio $Al/H_2O$ in the range of 0.25–2.

6. A composition according to claim 5 wherein the hydrogenation catalyst is in a reduced form.

7. A hydrocarbon conversion process comprising contacting a hydrocarbonaceous feed in a conversion zone at an elevated conversion temperature with a combination of a Gd alumino-silicate zeolite catalyst and a hydrogenation catalyst and recovering a hydrocarbon conversion product having an average molecular weight no greater than that of said first-named hydrocarbonaceous feed, said Gd alumino-silicate containing less than one alkali metal cation and at least one divalent or trivalent metal, metal oxide or metal hydroxide for every 12 atoms of aluminum in said alumino-silicate zeolite framework and wherein said framework has an Al/Si atomic ratio from 0.65–0.2.

8. A hydrocarbon conversion process comprising contacting a hydrocarbonaceous feed in a conversion zone at an elevated conversion temperature with a Gd alumino-silicate zeolite catalyst and recovering a hydrocarbon conversion product having an average molecular weight no greater than that of said lrst-named hydrocarbonaceous feed, said Gd alumino-silicate containing less than one alkali metal cation and at least one divalent or trivalent metal, metal oxide or metal hydroxide for every 12 atoms of aluminum in said alumino-silicate zeolite framework wherein said feed comprises a polycyclic aromatic hydrocarbon.

9. Process according to claim 8 wherein said feed comprises s-OHP or s-OHA or a mixture thereof.

10. Process according to claim 9 wherein said catalyst comprises an acidic Gd alumino-silicate zeolite catalyst and from 0.05 to 5 percent of a hydrogenation catalyst, said Gd alumino-silicate containing less than one alkali metal cation and at least one divalent or trivalent metal, metal oxide or metal hydroxide for every 12 atoms of aluminum in said alumino-silicate zeolite framework.

11. Process according to claim 10 wherein said Gd alumino-silicate catalyst is crystalline, is capable of adsorbing benzene and wherein said hydrogenation catalyst has been introduced into the zeolite by ion-exchange and is selected from the group consisting of platinum, palladium, nickel, nickel oxide, nickel sulfide, molybdenum oxide, molybdenum sulfide, cobalt oxide, palladium oxide and mixtures thereof.

12. Process according to claim 11 wherein said hydrogenation catalyst is in a reduced form.

References Cited

UNITED STATES PATENTS

| | | | |
|---|---|---|---|
| 3,140,253 | 7/1964 | Plank et al. | 208—120 |
| 3,247,099 | 4/1966 | Oleck et al. | 208—138 |
| 3,251,902 | 5/1966 | Garwood et al. | 260—683.64 |
| 3,301,917 | 1/1967 | Wise | 260—683.65 |
| 3,320,332 | 5/1967 | Schneider | 260—668 |
| 3,336,407 | 8/1967 | Bushick | 260—668 |

DELBERT E. GANTZ, Primary Examiner

C. R. DAVIS, Assistant Examiner

U.S. Cl. X.R.

208—120, 138; 252—455; 260—671, 672, 683.45, 683.65